United States Patent
Hunt et al.

(10) Patent No.: US 10,551,497 B2
(45) Date of Patent: *Feb. 4, 2020

(54) METHODS AND APPARATUSES FOR CONSTRUCTING A 3D SONAR IMAGE OF OBJECTS IN AN UNDERWATER ENVIRONMENT

(71) Applicant: NAVICO HOLDING AS, Egersund (NO)

(72) Inventors: Matthew Hunt, Pittsburgh, PA (US); Shahzad F. Kirmani, Scarborough, ME (US)

(73) Assignee: NAVICO HOLDING AS, Egersund (NO)

( * ) Notice: Subject to any disclaimer, the term of this patent is extended or adjusted under 35 U.S.C. 154(b) by 0 days.

This patent is subject to a terminal disclaimer.

(21) Appl. No.: 16/205,889

(22) Filed: Nov. 30, 2018

(65) Prior Publication Data

US 2019/0094356 A1    Mar. 28, 2019

Related U.S. Application Data

(63) Continuation of application No. 15/098,603, filed on Apr. 14, 2016, now Pat. No. 10,281,577.
(Continued)

(51) Int. Cl.
*G01S 15/89* (2006.01)
*G01S 7/62* (2006.01)
(Continued)

(52) U.S. Cl.
CPC ............. *G01S 15/89* (2013.01); *G01S 7/539* (2013.01); *G01S 7/6245* (2013.01);
(Continued)

(58) Field of Classification Search
CPC .......... G01S 15/89; G01S 15/96; G01S 7/539; G01S 7/62; G01S 7/6272; G01S 15/87; G01S 7/6245; G01S 15/8902
See application file for complete search history.

(56) References Cited

U.S. PATENT DOCUMENTS 5,537,380 A * 7/1996 Sprankle, Jr. ......... G01S 7/6245
367/105
6,449,215 B1    9/2002 Shell
(Continued)

FOREIGN PATENT DOCUMENTS

CN    102446367 B    3/2013
JP    H07270523 A    10/1995
(Continued)

OTHER PUBLICATIONS

U.S. Appl. No. 62/128,635, filed Mar. 5, 2015, in re: Proctor et al. entitled *Systems and Associated Methods for Producing a 3D Sonar Image.*
(Continued)

*Primary Examiner* — Hovhannes Bahdasaryan
*Assistant Examiner* — Amie M Ndure
(74) *Attorney, Agent, or Firm* — Nelson Mullins Riley & Scarborough LLP

(57) ABSTRACT

Methods, apparatuses, and computer program products are therefore provided for producing a 3D image of an underwater environment. An example method for providing an image of an underwater environment includes analyzing sonar returns to identify and display objects, such as fish or debris, in a 3D view. Such an image allows for differentiation between the sea floor and objects in a 3D sonar view. Some example methods provide for real-time tracking of
(Continued)

fish. Further, the fish or other objects may be displayed over a continuous surface geometry based on sonar returns from a lake, sea, or river "floor."

19 Claims, 12 Drawing Sheets

Related U.S. Application Data

(60) Provisional application No. 62/149,789, filed on Apr. 20, 2015.

(51) Int. Cl.
  *G01S 7/539* (2006.01)
  *G01S 15/96* (2006.01)
  *G01S 15/87* (2006.01)

(52) U.S. Cl.
  CPC ............ *G01S 7/6272* (2013.01); *G01S 15/87* (2013.01); *G01S 15/8902* (2013.01); *G01S 15/96* (2013.01)

(56) References Cited

U.S. PATENT DOCUMENTS

| | | | |
|---|---|---|---|
| 8,305,840 B2 | 11/2012 | Maguire | |
| 9,182,486 B2* | 11/2015 | Brown | G01S 15/8902 |
| 9,664,783 B2 | 5/2017 | Brown et al. | |
| 9,702,966 B2* | 7/2017 | Batcheller | G01S 17/89 |
| 9,766,328 B2 | 9/2017 | Black et al. | |
| 9,784,825 B2 | 10/2017 | Brown et al. | |
| 9,784,826 B2 | 10/2017 | Matson et al. | |
| 9,812,118 B2 | 11/2017 | Matson et al. | |
| 2003/0209893 A1* | 11/2003 | Breed | B60J 10/00 |
| | | | 280/735 |
| 2003/0235112 A1 | 12/2003 | Zimmerman et al. | |
| 2004/0129478 A1* | 7/2004 | Breed | B60N 2/002 |
| | | | 180/273 |
| 2005/0007880 A1* | 1/2005 | Zimmerman | G01S 7/5273 |
| | | | 367/103 |
| 2005/0099887 A1 | 5/2005 | Zimmerman et al. | |
| 2007/0159922 A1 | 7/2007 | Zimmerman et al. | |
| 2011/0013485 A1 | 1/2011 | Maguire | |
| 2012/0099395 A1 | 4/2012 | Debrunner et al. | |
| 2013/0148471 A1 | 6/2013 | Brown et al. | |
| 2013/0242700 A1* | 9/2013 | Blake | G01S 15/89 |
| | | | 367/88 |
| 2014/0064032 A1 | 3/2014 | Sloss | |
| 2015/0312526 A1 | 10/2015 | Coleman et al. | |
| 2016/0306040 A1 | 10/2016 | Hunt et al. | |
| 2017/0123062 A1 | 5/2017 | Coleman et al. | |
| 2017/0212230 A1 | 7/2017 | Wigh et al. | |

FOREIGN PATENT DOCUMENTS

| | | |
|---|---|---|
| JP | 3 558300 B2 | 8/2004 |
| KR | 20140021354 A | 2/2014 |

OTHER PUBLICATIONS

U.S. Appl. No. 62/128,641, filed Mar. 5, 2015, in re: Kirmani entitled Methods and Apparatuses for Reconstructing a 3D Sonar Image.
Olex: Main Page; Automatic Seabed Charting (1 pg.); website visited Jun. 23, 2016; http://www.olex.no/index_e.html.
Rusu et al.: "Print Cloud Library (PCL)"; http://www.pointclouds.org/about/ , 4 pages.
Wikipedia; *Delaunay triangulation*; Retrieved Jul. 27, 2016 <https://en.wikipedia.org/wiki/Delaunay_triangulation>.
Australian Patent Examination Report for Australian Application 2016201479 dated Nov. 2, 2016.
European Extended Search Report for European Application No. Ep 16159017 dated Dec. 13, 2016.
Canadian Office Action for Application 2,922,781 dated Feb. 9, 2017.
Australian Patent Examination Report for Australian Application 2016201479 dated Mar. 27, 2017.
Zhang, L. et al. "3D Reconstruction of seabed surface through sonar data of AUV's", Indian Journal of GeoMarine Sciences, vol. 41(6), Dec. 2012, pp. 509-515.

* cited by examiner

US 10,551,497 B2

METHODS AND APPARATUSES FOR CONSTRUCTING A 3D SONAR IMAGE OF OBJECTS IN AN UNDERWATER ENVIRONMENT

CROSS-REFERENCE TO RELATED APPLICATION

This application claims priority to and is a continuation of U.S. patent application Ser. No. 15/098,603, filed Apr. 14, 2016, and entitled "Method and Apparatuses for Constructing a 3D Sonar Image of Objects in an Underwater Environment", which claims priority to U.S. Provisional Patent Application No. 62/149,789, filed Apr. 20, 2015, and entitled "Method and Apparatuses for Constructing a 3D Sonar Image of Objects in an Underwater Environment," the contents of each being incorporated by reference herein in their entireties.

TECHNICAL FIELD

Example embodiments of the present invention relate generally to sonar systems and, more particularly, to methods and apparatuses for processing sonar returns to produce a three-dimensional (3D) image of objects in an underwater environment.

BACKGROUND

Sonar (SOund Navigation And Ranging) has long been used to detect waterborne or underwater objects. For example, sonar devices may be used to determine depth and bottom topography, detect fish, locate wreckage, etc. Sonar transducer elements, or simply transducers, may convert electrical energy into sound or vibrations at a particular frequency. A sonar sound beam is transmitted into and through the water and is reflected from objects it encounters. The transducer may receive the reflected sound (the "sonar returns") and convert the sound energy into electrical energy. These sonar returns provide time data that represents the time taken by the sound wave to travel from the transducer to the object and return as sonar returns to the transducer. Using the time in combination with the known speed of sound, a distance to the location of each sonar return may be determined.

In order to differentiate objects in an underwater environment and provide a detailed and intuitive image to the user, improved sonar systems are required. Applicant has further identified a number of deficiencies and problems associated with conventional sonar systems and other associated systems. Through applied effort, ingenuity, and innovation, many of these identified problems have been solved by developing solutions that are included in embodiments of the present invention, many examples of which are described in detail herein.

BRIEF SUMMARY

Methods, apparatuses, and computer program products are therefore provided according to example embodiments of the present invention for producing a 3D image of an underwater environment. Embodiments of the present invention provide for imaging an underwater environment, including analyzing sonar returns to identify and display objects, such as fish or debris, in a 3D view thus allowing differentiation between the sea floor and objects in a 3D sonar view. In some embodiments, the present invention may provide for allowing real-time tracking of fish. In some embodiments, the fish or other objects may be displayed over a continuous surface geometry based on sonar returns from a lake, sea, or river "floor."

In this regard, sonar return data is received from the underwater environment. The sonar return data may be formed into a 3D matrix/point cloud that includes a plurality of sonar returns that each define 3D positional values (such as a distance value, an angle, and a position value). The sonar return data may be captured by any type of sonar system. For example, in some embodiments, the transducer elements are configured in an array that enables determination of a distance value, a strength value, and an angle associated with each return. The 2D sonar return data is taken from a theoretical 2D slice of the underwater environment. The position of the watercraft when capturing the 2D slice may be used for generation of the position value that forms the third dimension. In some embodiments, as the watercraft travels along the surface, multiple sets of 2D sonar return data are taken from corresponding 2D slices of the underwater environment.

The 3D point cloud can then be processed to determine a cluster of sonar returns that correspond to one or more objects, such as fish, rocks, debris, the bottom surface, or the like. Those sonar returns can be used to form a 3D image for display to a user that includes the objects. In some cases, additional processing can be performed to determine characteristics (e.g., size, shape, movement, etc.) of the object. This information can be provided to the user and/or used in forming the 3D image. For example, a trail can be displayed showing movement of the object (e.g., a fish swimming in the underwater environment).

An example embodiment of the present invention includes a method for imaging an underwater environment. The method comprises generating, by a sonar signal processor, a 3D matrix based on sonar return data received from the underwater environment, wherein the 3D matrix comprises a plurality of sonar returns each defined by 3D positional values. The method further comprises determining, based on at least the 3D positional values of each of the plurality of sonar returns, one or more groups of sonar returns among the plurality of sonar returns in the 3D matrix associated with one or more objects in the underwater environment, wherein the one or more objects are different than a bottom surface of the underwater environment. The method further comprises generating a 3D image of the one or more groups of sonar returns associated with the one or more objects in the underwater environment.

In some embodiments, the method further comprises displaying the 3D image of the one or more groups of sonar returns associated with the one or more objects in the underwater environment.

In some embodiments, the method further comprises determining the one or more groups of sonar returns associated with the one or more objects in the underwater environment by generating, based on the 3D positional values for each of the plurality of sonar returns, a 3D representation of all of the plurality of sonar returns in the 3D matrix such that each of the plurality of sonar returns defines an x coordinate, a y coordinate, and a z coordinate; and determining one or more clusters among the plurality of sonar returns in the 3D representation, wherein the one or more clusters among the plurality of sonar returns in the 3D representation each comprise sonar returns that are within a threshold distance of each other within the 3D representation. Additionally, in some embodiments, the method further comprises determining the one or more groups of sonar returns associated with the one or more objects in the underwater environment further by determining which corresponds to the bottom surface of the underwater environment by determining the cluster with the largest number of sonar returns; and removing the cluster that corresponds to the bottom surface of the underwater environment from the 3D representation. Further, in some embodiments, the method comprises determining the one or more groups of sonar returns associated with the one or more objects in the underwater environment further by removing any sonar returns from the 3D representation that include a z coordinate below a corresponding z coordinate of the cluster that corresponds to the bottom surface of the underwater environment.

Additionally or alternatively, the method comprises generating a 3D image of the cluster that corresponds to the bottom surface of the underwater environment, and generating a 3D image of the underwater environment based on the 3D image of the cluster that corresponds to the bottom surface of the underwater environment and the 3D image of the one or more groups of sonar returns associated with the one or more objects.

In some embodiments, the method further comprises displaying the 3D image of the underwater environment.

In some embodiments, the method further comprises generating a second 3D matrix based on second sonar return data received from the underwater environment. Additionally, the method comprises determining one or more second groups of sonar returns among a plurality of sonar returns in the second 3D matrix associated with one or more objects in the underwater environment. Further, the method comprises updating the 3D image of the underwater environment by updating the 3D image of one or more groups of sonar returns associated with the one or more objects in the underwater environment without updating the 3D image of the cluster that corresponds to the bottom surface.

In some embodiments, the method further comprises determining the one or more groups of sonar returns associated with the one or more objects in the underwater environment further by determining a material of an object causing the sonar returns of each cluster based on power and gain of the at least one transducer element, density of the sonar returns within the cluster, and the strength value of at least one of the sonar returns within the cluster.

In some embodiments, the method further comprises determining the one or more groups of sonar returns associated with the one or more objects in the underwater environment further by determining at least one of a shape, a size, and a direction of movement of an object associated with each cluster.

In some embodiments, the method further comprises determining the one or more groups of sonar returns associated with the one or more objects in the underwater environment further by generating a first 2D representation of each sonar return in at least one cluster, wherein the first 2D representation includes the x coordinate and the y coordinate of each sonar return in the at least one cluster; generating a second 2D representation of each sonar return in at least one cluster, wherein the second 2D representation includes the x coordinate and the z coordinate of each sonar return in the at least one cluster; generating a third 2D representation of each sonar return in at least one cluster, wherein the third 2D representation includes the y coordinate and the z coordinate of each sonar return in the at least one cluster; and analyzing the first 2D representation, the second 2D representation, and the third 2D representation to determine one or more characteristics of the at least one cluster. In some embodiments, the one or more characteristics of the at least one cluster include at least one of a shape, a size, and a direction of movement of an object associated with each cluster.

In some embodiments, the method further comprises analyzing the one or more groups of sonar returns associated with the one or more objects to determine movement of the one or more objects. Additionally, the method comprises generating the 3D image of the one or more sonar returns associated with the one or more objects by generating a trail that corresponds to the movement of the one or more objects.

In some embodiments, the method further comprises generating a second 3D matrix based on second sonar return data received from the underwater environment. Additionally, the method comprises determining one or more second groups of sonar returns among a plurality of sonar returns in the second 3D matrix associated with the one or more objects in the underwater environment. Additionally, the method comprises analyzing the one or more groups of sonar returns associated with the one or more objects and the one or more second groups of sonar returns associated with the one or more objects to determine movement of the one or more objects. Further, the method comprises generating the 3D image of the one or more sonar returns associated with the one or more objects by generating a trail that corresponds to the movement of the one or more objects.

In some embodiments, the method further comprises generating the 3D image of the one or more groups of sonar returns associated with the one or more objects by generating one or more mesh images characterizing the respective one or more objects based on the sonar returns associated with the corresponding object.

In some embodiments, the method further comprises generating the 3D image of the one or more groups of sonar returns associated with the one or more objects by positioning one or more predefined icons for the respective one or more objects, wherein each predefined icon is positioned within the underwater environment at a location corresponding to the sonar returns associated with the respective object.

In some embodiments, the method further comprises generating the 3D image of the one or more groups of sonar returns associated with the one or more objects by generating raw sonar return data associated with the sonar returns associated with the one or more objects.

In some embodiments, the 3D positional values of each sonar return include a distance value, an angle, and a position of capture of the sonar return.

Additional example embodiments of the present invention include apparatuses, systems, and computer program products associated with various embodiments described herein, including, for example, the above described method embodiments.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
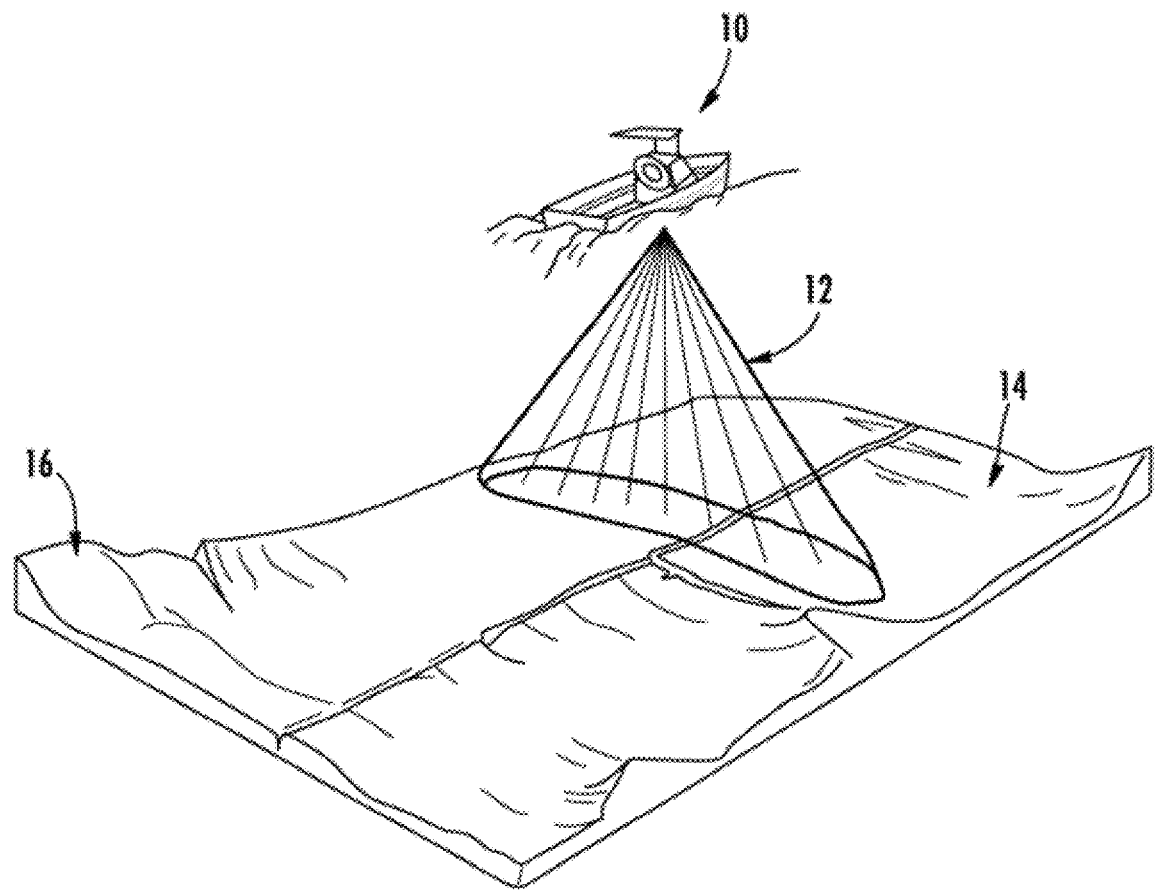
FIG. 1 illustrates an example of a sonar transducer emitting sonar pulses, in accordance with example embodiments described herein.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout.

Methods, apparatuses, and computer program products are therefore provided according to example embodiments of the present invention for producing a three dimensional (3D) image of an underwater environment. Embodiments of the present invention provide for imaging an underwater environment, including analyzing sonar returns to identify and display objects, such as fish or debris, in a 3D view thus allowing differentiation between the sea floor and objects in a 3D sonar view. In some embodiments, the present invention may provide for allowing real-time tracking of fish. In some embodiments, the fish or other objects may be displayed over a continuous surface geometry based on sonar returns from a lake, sea, or river "floor."

Prior devices may generally gather sonar depth and range data and then post-process it on powerful workstations. Embodiments of the present invention provide improvements that allow for processing to occur in real-time (or with slight delay, as described herein) on a relatively low-powered ARM device, making generation of the 3D image possible. Embodiments provide computational efficiencies and reduction of the sonar points to match the physical resolution of a system resulting in a fast implementation of the surface reconstruction technique.

Overview of Example Sonar and Transducer Elements

Sonar systems, such as sonar depth finders, sidescan sonars, downscan sonars, and sonar fish finders, are commonly employed by boaters, sport fishermen, search and rescue personnel, researchers, surveyors, and others. With reference to FIG. 1, a boat 10 may include a sonar system configured to create electrical pulses from a transceiver. A transducer then converts the electrical pulse into sound waves 12, which are sent into the water. In the depicted embodiment, a fan-shaped sound beam (e.g., a beam shape created from one or more linear transducers) is being transmitted into the water, however, as will be apparent to one of ordinary skill in the art in view of this disclosure, other sound beam configurations (e.g., conical shaped, elliptical shaped, multiple conical shaped, etc.) may be transmitted.

When the sound waves 12 strike anything of differing acoustic impedance (e.g., the sea floor or something suspended in the water above the bottom), the sound waves 12 reflect off that object. These echoes or sonar returns may strike the transducer or a separate receiver element, which converts the echoes back into an electrical signal which is processed by a processor (e.g., a sonar signal processor) and sent to a display (e.g., an LCD) mounted in the cabin or other convenient location in the boat. This process is often called "sounding". Since the speed of sound in water is constant (approximately 4800 feet per second in fresh water), the time lapse between the transmitted signal and the received echoes can be measured and the distance to the objects determined. This process repeats itself many times per second. The results of many soundings are used to build a picture on the display of the underwater environment.

For example, the sound waves 12 may bounce off the floor 14 of the body of water and reflect back to the boat, thereby indicating a depth of the water at that location. Sometimes, the floor 14 may have an uneven topography (e.g., a raised surface 16) that may reflect different depths of the water at different locations. In such a circumstance, the sound waves 12 reflect off the various floor surfaces and back to the boat 10. If the raised surface 16 is closer to the boat 10, the sound waves 12 will reach the boat 10 faster and the sonar system will calculate that the depth is shallower at raised surface 16 than at surface 14. Additionally, objects on the floor (e.g., sunken logs, rocks, wreckage of ships, etc.) reflect the sonar beams and are detected as topographical features. Fish in the water also create their own characteristic sonar returns.

In a downscan configuration, a transducer may transmit sound waves 12 directly down beneath the boat 10 and the transducer or another, receiving transducer, may receive downscan sonar returns from an area generally beneath the boat. The number of downscan returns received over time may produce a plot of the distance traveled by each return, which may illustrate the distance to the surface 14 from which the returns are reflected. In a sidescan configuration, a transducer may transmit sound waves 12 to one or both sides of the boat (e.g., in a fan-shaped beam), and the transducer, or a receiving transducer, may receive the sidescan returns. The number of sidescan returns received over time may produce a plot of the distance to each return, which may illustrate the profile of the surface 14 to either side of the boat.

Embodiments of the present invention may include multiple transducer elements in either or both of a downscan configuration and a sidescan configuration cooperating to receive returns from the underwater environment. The returns may be compared via the process of interferometry to determine the position from which each sonar return originated. In some embodiments, the return data may generate an angle associated with each position from which the returns are received. The angle value may allow the sonar system to plot the position of the returns in three dimensional (3D) space in order to construct a 3D image of the underwater environment.

As detailed herein, embodiments of the present invention may generate 3D images by interferometrically processing returns from the same area of the underwater environment with two or more transducer elements to determine the angle of each return and plot the returns in 3D space. The transducer assembly may emit a fan shaped beam downwardly and outwardly from either side of the boat. In some embodiments, as detailed below, the downscan transducer transmits the fan-shaped beam, and the sidescan transducer arrays receive returns from the sonar pulses transmitted by the downscan transducer. In some alternative embodiments, one or more elements of the sidescan transducer arrays may transmit sonar pulses. Alternatively, a downscan transducer array may be used, either alone or in combination with additional arrays, in a similar manner to the sidescan transducer arrays detailed herein.

Figure 2A:
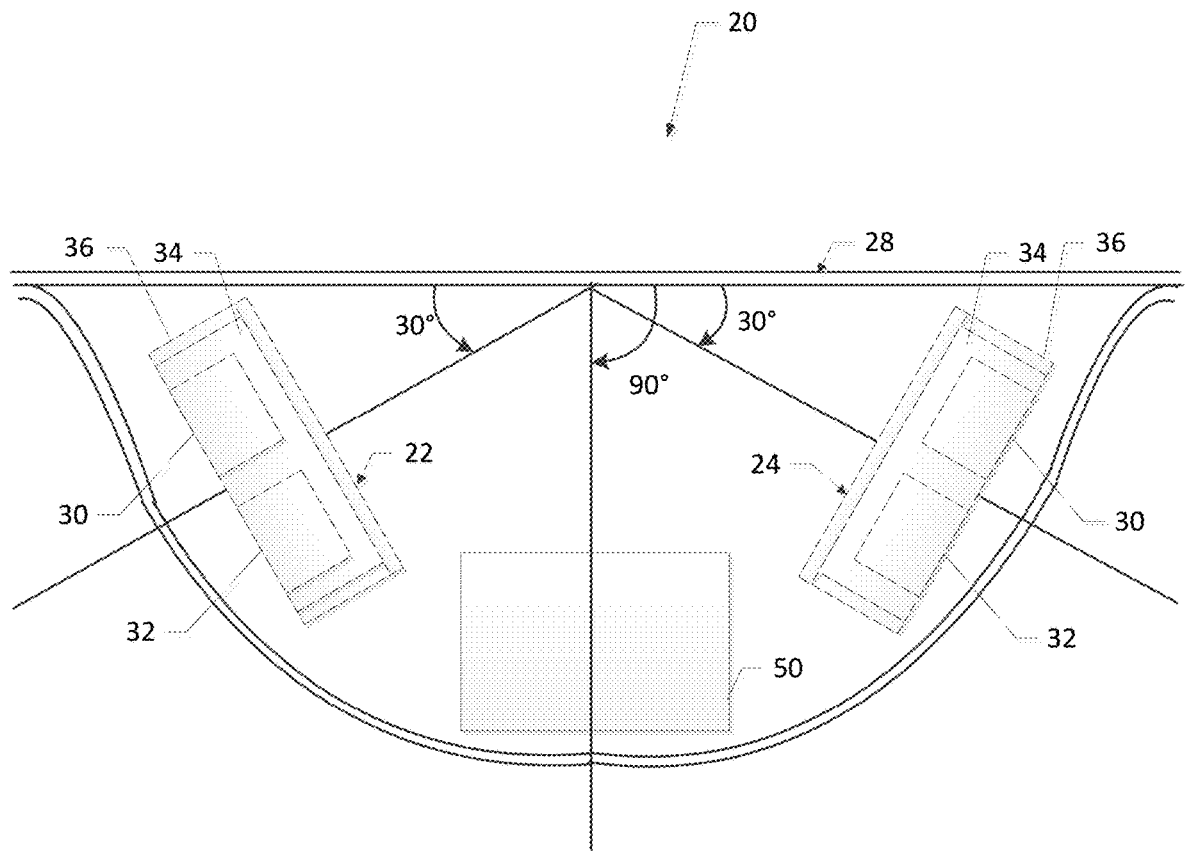
FIGS. 2A-2C illustrate cross sectional views of example transducer assemblies capable of being used in accordance with example embodiments of the present invention.

FIG. 2A illustrates a cross-sectional view of an example transducer assembly 20. Each sidescan transducer array 22, 24 is shown having two transducer elements 30, 32. In some embodiments, the downscan transducer 50 transmits sonar pulses at least downwardly in a fan-shaped beam, and each of the sidescan transducer arrays 22, 24 is configured to receive returns from the underwater environment on its respective side of the housing. The sidescan transducer arrays 22, 24 may be oriented downwardly and outwardly in their respective directions.

While traditional sidescan may utilize a single sidescan transducer element on either side of the housing for receiving sidescan sonar returns, embodiments of the present invention may use at least two sidescan transducer elements 30, 32 positioned in a sidescan transducer array 22, 24 on the same side of the housing 28. In such embodiments, the sidescan transducer elements 30, 32 may be positioned in parallel mounting slots of an absorptive material 34 within each respective transducer array 22, 24. The transducer arrays 22, 24 may include a shielding material 36 for preventing interference between transducers and improving the return data.

With continuing reference to FIG. 2A, the transducer arrays 22, 24 may be held at a predetermined angle relative to the surface of the body of water. For example, the emitting surfaces of the transducer arrays 22, 24 may be oriented at 30 degrees from the surface of the body of water in order to transmit and/or receive sonar pulses. In some embodiments, an emitting surface of the downscan transducer 26 may be perpendicular to the surface of the body of water. The transducer elements 30, 32 may also be positioned at a predetermined distance from each other. The predetermined distance may be designed based on the frequency or wavelength of the sonar pulses. For example, the predetermined distance between the transducer elements 30, 32 may be a fraction or multiple of the wavelength of the sonar pulses (e.g., 1/10, 1/8, 1/6, 1/4, 1/2, 1, 2, 3, or 4 times the wavelength). In some embodiments, the predetermined distance may be less than or equal to half the wavelength of the sonar pulses.

Figure 2B:
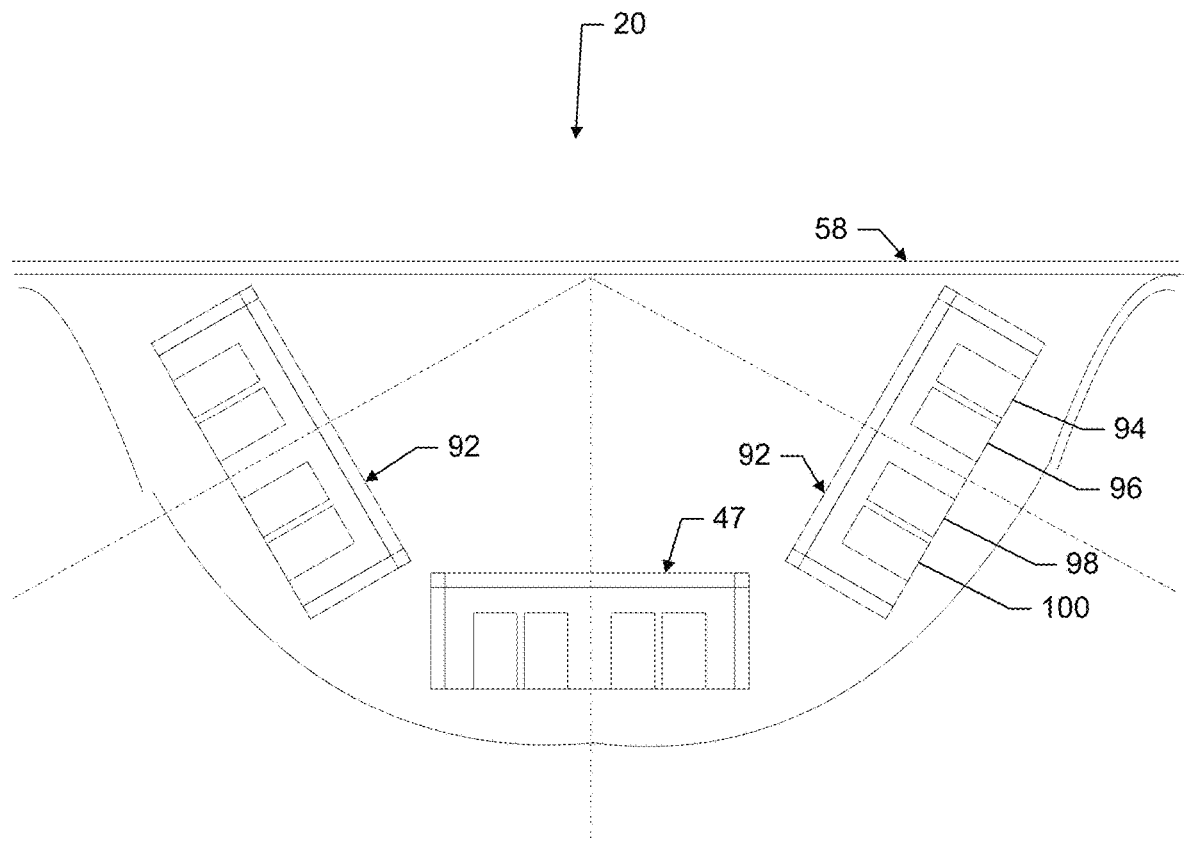
Figure 2C:
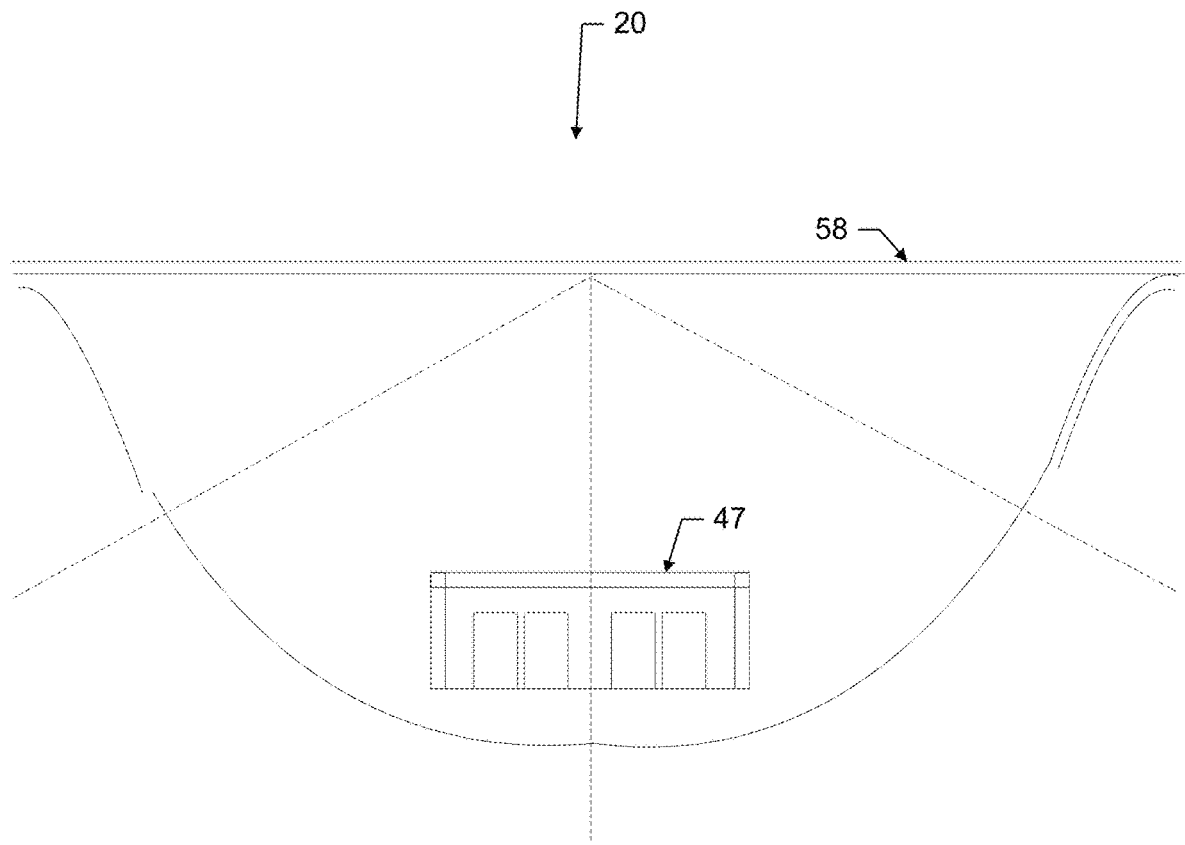

In some embodiments, the downscan transducer element 50 (shown in FIG. 2A) may be replaced with a downscan transducer array 47 as shown in FIG. 2B. The downscan transducer array 47 may include the same structure and function as described herein with respect to the sidescan transducer arrays (e.g., sidescan transducer array 24 shown in FIG. 2A) with the exception of the orientation of the array. In some embodiments the downscan transducer array 47 may be used alone in the housing 58 with no sidescan transducer arrays 92 as shown in FIG. 2C. Additionally, though not shown, one or more transducer arrays (such as the transducer array 24) may be aimed forwardly and downwardly from the watercraft such that the transducer array is configured to be forward looking. Other orientations are also contemplated by embodiments of the present invention. Additionally, in some embodiments, the transducer elements may be mounted to a towfish or other device and aimed into the underwater environment.

U.S. Provisional Patent Application No. 62/128,635, filed Mar. 5, 2015 and entitled "Systems and Associated Method for Producing a 3D Sonar Image", which is assigned to the same entity as this corresponding application, provides additional detail regarding example transducer systems capable of receiving sonar returns compatible with example embodiments of the present invention, and is hereby incorporated by reference herein in its entirety. Additionally, the above referenced patent application provides additional detail regarding interferometry processing used to determine the angle associated with each sonar return for example sonar return data utilized with example embodiments of the present invention.

Overview of Example Underwater Environment Reconstruction

Sonar returns are generated by a sonar ping and the returned values are represented as sonar return data. The sonar returns may be received from the sonar ping bouncing back from actual features underwater, or spurious returns from echoes or debris.

In some embodiments, the interferometric return data may be received from two-dimensional slices of the underwater environment (e.g., the fan-shaped beams from linear transducers used in each transducer array have narrow width in the direction of travel of the watercraft. In this regard, each sonar return of the 2D sonar data may be defined by, at least, a distance and an angle (e.g., 2D). Further, even though there may be some space within the narrow width of the fan-shaped beam, the sonar returns can be defined to ignore that width and, thus, be assumed to be 2D. The 2D sonar data may be two dimensional sets of data oriented perpendicular to the direction of travel of the boat (e.g., parallel to the plane of the fan-shaped beam).

The 2D sonar data may comprise data from one or more transducer arrays (e.g., the sidescan and/or downscan transducer arrays). For example, in some embodiments, a left or first sidescan transducer array may capture interferometric sonar returns from a portion of a 2D slice on a left side of the boat and a right or second sidescan transducer array may capture interferometric sonar returns from a portion of a 2D slice an opposite or right side of the boat. In such embodiments, the 2D sonar data may be defined by joining the returns from the first and second sidescan transducer arrays to form a single data set. In some embodiments the returns from the first and second sidescan transducer arrays may be joined at an axis representing the line of travel of the boat. In some embodiments a downscan transducer array may be used alone or in combination with one or more sidescan transducer arrays to produce 2D sonar data.

Additionally, in some embodiments, the 2D sonar return data may define a strength value associated with the strength of the sonar return, for example in a [0.0, 255.0] range. In such embodiments, each sonar return may define a strength value, a distance value, and an angle.

In some embodiments, each set of sonar returns (corresponding to a set of sonar pulses) may generate a single slice of 2D sonar data. By knowing the position of the watercraft when the 2D sonar data is captured, a third dimension for the sonar return data can be formed. In this regard, the sonar returns may define 3D positional values such as a distance value, an angle, and a position value. In some embodiments, the sonar returns may build up over time as the watercraft travels.

Though the above described embodiments build up 3D sonar return data based on using interferometry and the position of the boat, other methods and sonar systems may be used to generate the 3D sonar return data. In this regard, other types of 3D positional values are contemplated (e.g., a distance value, a first angle, and a second angle; an x coordinate, a y coordinate, and a z coordinate; other combinations of those values, etc.).

Embodiments of the present invention generate a 3D matrix (or 3D point cloud). In assembling the 3D matrix, the distance and angle of each sonar return may be used to define a two-dimensional position in space. Additionally, the associated 2D slice that the sonar return was received in may be applied to define the remaining dimension, thereby populating each sonar return into a 3D matrix. In this regard, each sonar return can be defined to have an xyz position in space and an associated strength value.

Embodiments of the present invention can then determine various objects or the bottom surface of the body of water from the generated 3D matrix. Some embodiments attempt to filter out noisy returns (e.g., echoes).

Figure 3:
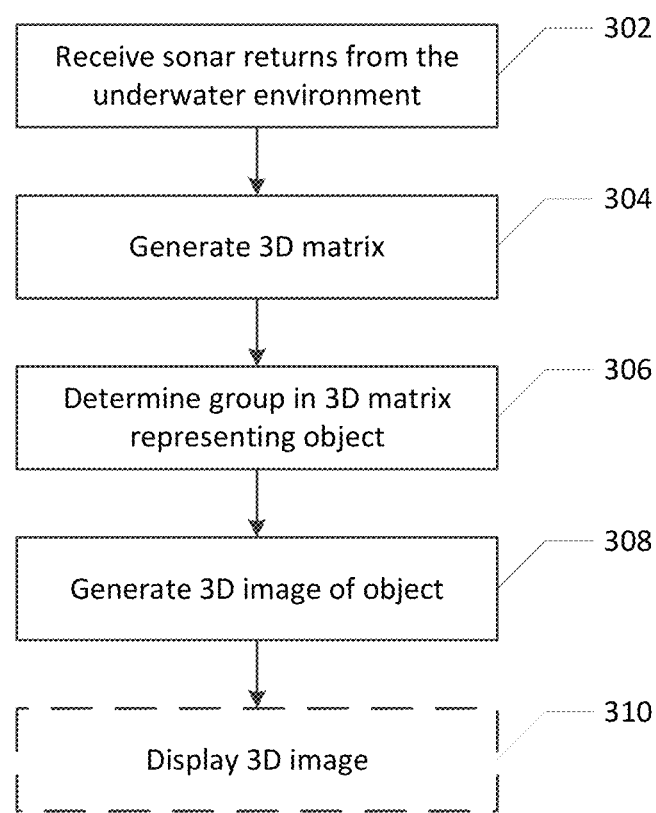
FIG. 3 illustrates a flow chart of exemplary operations for generating a 3D image of an object using sonar return data performed by an apparatus in accordance with an example embodiment of the present invention.

FIG. 3 illustrates a flow chart of exemplary operations for generating a 3D image of an object in the underwater environment using sonar return data. Operations may begin at block 302 wherein sonar return data from the underwater environment is received. In some embodiments, one or more transducer elements may be affixed or otherwise connected to a watercraft (e.g., a boat or the like), and the plurality of sets of 2D sonar return data are received as the watercraft travels on, under, or above the surface of the body of water. Each of the plurality of sets of 2D sonar return data comprises individual sonar returns that correspond to a corresponding 2D slice of the underwater environment when the sonar return was received. In some embodiments, this 2D sonar return data may be received by one or more transducer elements which are aimed at least one of forwardly, downwardly, or outwardly from a watercraft which is traversing the body of water. Each of the points in the 2D array may be characterized by the depth and cross-range of the point in space and may comprise a strength value, a distance value, and an angle.

In some embodiments, the incoming sonar returns for each set of 2D sonar return data may be pre-filtered to retain the strongest return in each angular sub-fan of the return, thus, eliminating multiple reflections within an arbitrary sub-fan. In some embodiments, the filtering of the 2D sonar returns may be based on the angle and strength value for each of the return points, such as removing points not having the highest strength value within a range of angles (e.g., the strongest sonar return in each 0.5° sub fan is retained). In some embodiments, more than one sonar return in each sub-fan region is retained (such as the two strongest sonar returns).

At block 304, a 3D matrix (e.g., 3D point cloud) is generated, such as by a sonar signal processor, based on the received sonar return data. In some embodiments, the 3D matrix is built in swaths comprising a defined number (N) of 2D sonar returns (though the number (N) may in other embodiments be variable). For example, in some embodiments, a 3D matrix may be generated from a series of fifty sets of 2D sonar return data (e.g., from fifty 2D slices of the underwater environment). Each of the sets of 2D sonar return data may include a different number of points, and in some embodiments, a set of 2D sonar return data may include up to a maximum number (M) of points. As such, each swath which is used in generating a 3D matrix may include up to N×M points.

In some embodiments, a statistical outlier removal filter may be applied to remove points that are not within a certain strength weighted mean and standard deviation based Euclidean distance from each other. This allows for removing stray returns, such as returns caused by echoes or bubbles in the water.

At block 306, groups of points in the 3D matrix may be determined, such as by a sonar signal processor. For example, a group (e.g., a cluster) may define a grouping of sonar returns in the 3D matrix that are all within a certain threshold distance of each other or, in some embodiments, a threshold distance from a chosen position. In some embodiments, additional processing techniques could be used, such as weighting the results by strength value to better define accurate clusters. After the clusters in the 3D matrix have been identified, a determination may be made as to which clusters may represent one or more objects, such as fish, rocks, debris or any other "thing" that may be found in an underwater environment. Additionally, as detailed below, the bottom surface of the underwater environment may be determined.

At block 308, a 3D image (e.g., a reconstruction, representation, etc.) of an object associated with at least one group of sonar returns among the plurality of sonar returns in the 3D matrix may be generated. Additional detail regarding possible 3D images is detailed herein. Optionally, at block 310, a display of the 3D reconstruction of, for example, the object may be provided, such as via a user interface or display (e.g., a LCD display).

Figure 4:
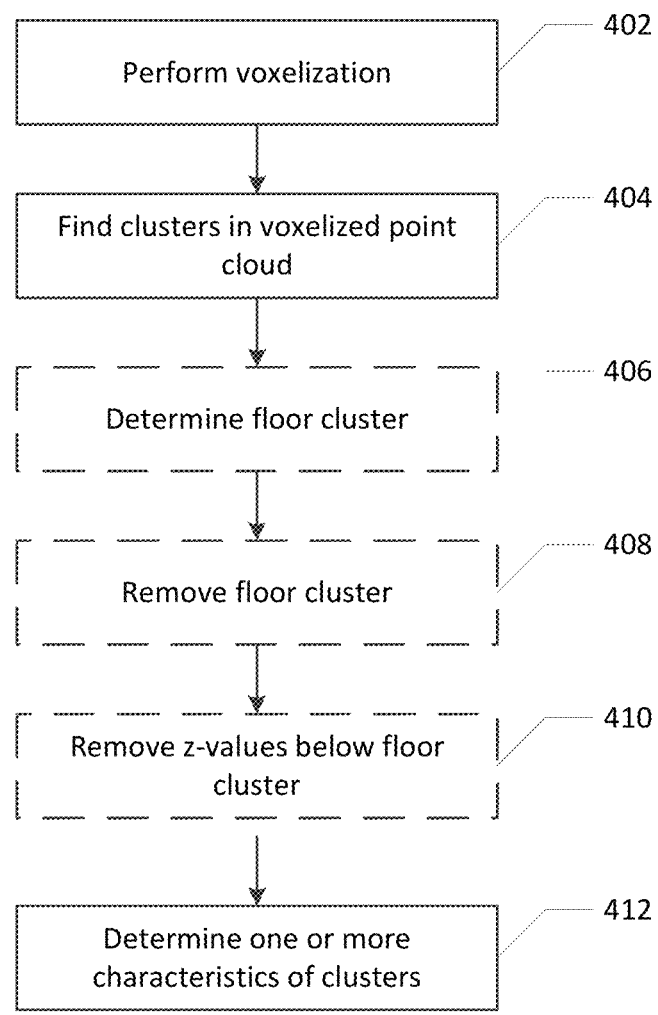
FIG. 4 illustrates a flow chart of exemplary operations for determining and analyzing a three dimensional point cloud or matrix performed by an apparatus in accordance with an example embodiment of the present invention.

FIG. 4 illustrates a flow chart of exemplary operations for generating a three dimensional point cloud or matrix, such as performed in block 304 of FIG. 3. At block 402, the 3D matrix is voxelized into a 3D grid space (e.g., a 3D point cloud or 3D representation of the points in the 3D matrix). For example, the distance and angle of each sonar return may be used to define a two-dimensional position in space. Additionally, the associated 2D slice that the sonar return was received in may be applied to define the remaining dimension, thereby populating each sonar return into a 3D point cloud. In this regard, each sonar return can be defined to have an xyz position in space and, in some cases, an associated strength value. The 3D point cloud may have a fixed xyz resolution which may be determined by the physical resolution set by the sonar transducer settings, the nominal speed of the boat and the sonar ping rate. The voxelization has an effect of homogenizing the noisy data in a 3D grid in space and combines all points in a weighted average sense, based on their strength, in a given voxel. The strengths of all points within a given voxel are averaged to assign a strength value to a voxelized return.

Blocks 404-412, which in some embodiments may correspond to block 306 in FIG. 3, describe a process for determining and/or identifying clusters of points corresponding to objects in, for example, the voxelized 3D point cloud. The clustering may be performed by calculating the weighted standard deviation of the distance of all of the other points in a swath from a given point. The points within a certain ratio of the weighted standard deviation are included within a cluster for a given point. This results in separating different clusters of points in the point cloud.

At block 406, a determination may be made as to which cluster represents the bottom surface. In some embodiments, the largest cluster is assumed to be the bottom surface. At block 408, filtering may be performed such that the largest cluster (i.e. the cluster identified as the floor or bottom surface) is removed. At block 410, filtering may be performed to remove sonar returns with z coordinates that are below that of the floor cluster. In this regard, such sonar returns may not be considered pertinent to forming a 3D image of an object or the overall underwater environment. At block 412, the remaining clusters may be subjected to reprocessing, further processing, additional processing or the like, for example, subsequent to or in parallel with the preceding operations to determine characteristics of the clusters and, thus, help determine the type of object and/or characteristics about the object.

In some embodiments, portions or all of the above example operation 400 can be used to determine a group (e.g., cluster) of sonar returns that correspond to an object in the underwater environment, such object being different than the bottom surface of the underwater environment. In this regard, in some embodiments, the operations described herein may be performed subsequent to or in parallel with the identification and the removal of the largest point cloud, for example, as performed at block 410 of FIG. 4.

A plurality of methodologies exist for determining/calculating/identifying which clusters correspond to particular objects. That is, embodiments of the present invention may be configured for determining, based on, for example, at least the angle of each of the plurality of sonar returns and at least one of the strength value or the distance value of each of the plurality of sonar returns, one or more groups of sonar returns among the plurality of sonar returns in the 3D matrix, that correspond to particular objects. Further, as described herein, there are a number of different methodologies for determining characteristics of the clusters and/or objects. These characteristics can be used to determine/identify clusters and objects. Additionally, these characteristics can be used to generate a 3D image of the various objects or include features in the 3D image useful for the observer.

In some embodiments, an exemplary process for differentiating a particular object (e.g., a fish) from a different object (e.g., debris, a rock, or the like) may involve identifying those clusters that move. Additionally or alternatively, filtering techniques utilizing density and strength of returns may be applied to differentiate those clusters corresponding to objects of one type (e.g., fish) from those corresponding to different objects. Moreover, filtering may be performed based on classification methods utilizing high-order statistical parameters (e.g., skewness, kurtosis, or the like).

Figure 5:
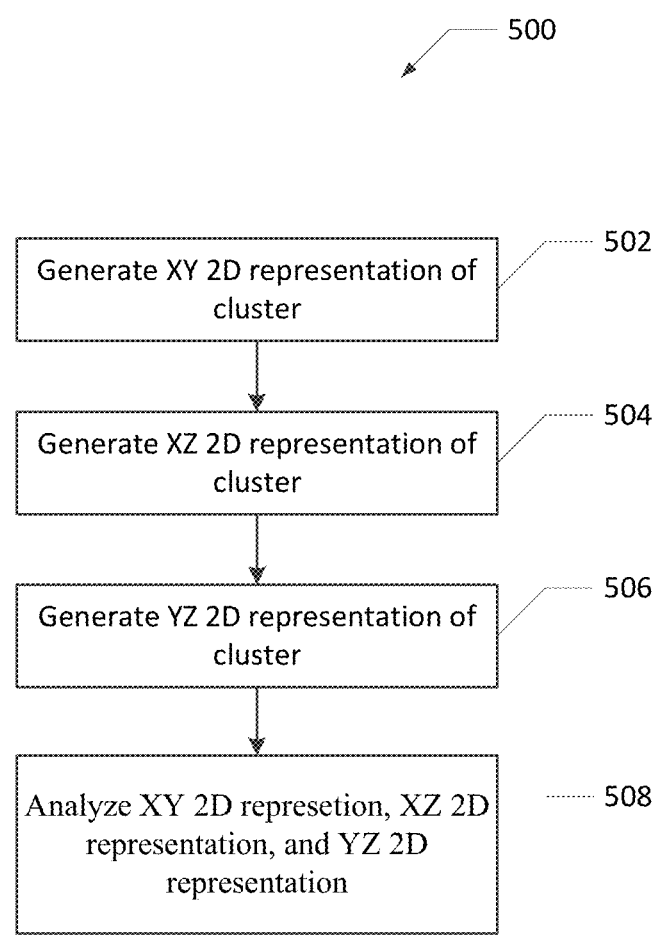
FIG. 5 illustrates a flow chart of exemplary operations for determining characteristics of a cluster of sonar returns in accordance with an example embodiment of the present invention.

FIG. 5 illustrates a flow chart of exemplary operations that may be performed to identify characteristics of a cluster or group of sonar returns, such as performed at block 412 in FIG. 4. At block 502, each sonar return for the group or cluster may be used to form a first 2D representation by use of the x coordinate and the y coordinate. This projects each sonar return on a 2D representation that is in the XY plane. At block 504, each sonar return for the group or cluster (e.g., the same sonar returns) may be used to form a second 2D representation by use of the x coordinate and the z coordinate. This projects each sonar return on a 2D representation that is in the XZ plane. At block 506, each sonar return for the group or cluster (e.g., the same sonar returns) may be used to form a third 2D representation by use of the y coordinate and the z coordinate. This projects each sonar return on a 2D representation that is in the YZ plane. Then, at block 508, by analyzing the three different 2D representations (e.g., comparing, processing, etc.), image processing techniques can be used to determine characteristics of the group or cluster of sonar returns (and, thus, characteristics about the associated object).

As such, some embodiments of the present invention may be configured to identify high-order statistical moments (e.g., skewness and kurtosis) of each of one or more groups of sonar returns among the plurality of sonar returns in the 3D matrix. And subsequently, in some embodiments, the learning algorithm, as referenced above, may be implemented to classify each of one or more groups of sonar returns based on the values of one or more metrics (e.g., classifying groups into, for example, a group characterized by, for example, size and shape, which may correspond to a particular object (e.g., fish) and a second group that is less likely to correspond to the particular object. As one of ordinary skill would understand, skewness is the measure of asymmetry of the probability distribution of a real-valued random variable and kurtosis is a measure of the shape of the probability distribution of a real-valued variable.

In some exemplary embodiments, for example, machine learning algorithms which are capable of automatic pattern classification, and when executed via, for example, a sonar signal processor or the like, may determine if an object of interest (e.g., a fish) is present using one or more characteristics of an image. That is, those clusters that correspond to fish exhibit different and identifiable characteristics, and embodiments herein may be configured to determine a value of one or more metrics, each metric alone or in combination with a second metric, capable of being utilized in the determination of a fish. For example, embodiments of the present invention may be configured to utilize higher-order statistical moments such as skewness and kurtosis of a cluster to identify and/or characterize the size and shape of the object. These moments (e.g., skewness, kurtosis, or the like) are less sensitive to stray points that may be included in a cluster. In some embodiments, rotation and scale invariant Hu moments may be utilized in shape characterization to improve the classification.

In some embodiments, the higher order statistical moments for each can be derived in 3D space (e.g., a 3D point cloud). In other embodiments, the clusters of sonar returns in the 3D point cloud can be projected onto three basic axial planes (xy, yz and xz) and the statistical moments of the three 2D projections of each cluster can be determined The combination of these three sets of statistical moments can generate a statistical signature for the objects.

Additionally or alternatively, the strength value of one or more of the sonar returns within the group or cluster can be used to determine characteristics. For example, knowing the power and gain of the transducer element that received the sonar returns, the density of the sonar returns and their strength values can be used to determine a material (or other characteristic) of the object associated with the sonar returns. For example, the material associated with certain types of fish differs from other types of objects (e.g., ships, trees, various structures, etc.).

While the above description provides example operations for determining characteristics of a cluster or group of sonar returns, other operations are contemplated (e.g., analyzing correlated groups/clusters over time, analyzing statistics or patterns of the sonar returns, etc.).

While the above noted examples detail example characteristics of material of the object, other characteristics are contemplated. For example, processing techniques can be used to determine size, shape, direction of movement, movement, or other characteristics. As noted above, the characteristics can help determine the type of object associated with the sonar returns, thereby enabling selection of an appropriate cluster or group of sonar returns to use for generation of the 3D image of the object.

Some embodiments of the present invention may be configured for identifying and/or determining whether an object is moving. Determining whether an object is moving may be performed in a number of ways. For example, in some embodiments, a second point cloud or 3D matrix may be generated using, for example, second sonar returns from the underwater environment. Subsequently, once a second 3D matrix may be generated, such as by a sonar signal processor, a second set of one or more clusters of points in the 3D matrix may be correlated to the one or more groups/clusters identified in the first 3D matrix. In this regard, some embodiments of the present invention may determine whether an object identified in the underwater environment has moved from the position of the object in the first 3D matrix.

In some embodiments, detection of movement may be performed in the first 3D matrix. For example, by detecting elongation or compression of, for example, objects that may otherwise resemble a particular object may be indicative of movement, for example, relative to the transducer.

In some embodiments, filtering can be performed to remove clusters that correspond to objects that are not of interest. For example, filtering may remove clusters based on the distance and material such that those groups failing to meet a predetermined criteria are removed. That is, returns caused by rocks or other debris may be identified as having a density or strength greater than those returns caused by fish and, as such, are removed. Filtering, in some embodiments, may be performed based on classification methods utilizing high-order statistical parameters (e.g., skewness, kurtosis, or the like).

In this regard, determination of one or more groups of sonar returns among the plurality of sonar returns in the 3D matrix that correspond to fish may be comprise filtering the remaining clusters based on the value of one or more metrics, or in some embodiments, in an instance in which a learning algorithm is utilized in the classification of objects, determination may be made based on the classification of the group. That is, determination of one or more groups of sonar returns among the plurality of sonar returns in the 3D matrix that correspond to fish may comprise filtering the remaining clusters based on high-order statistical moments.

Overview of Example Display Techniques

Figure 6:
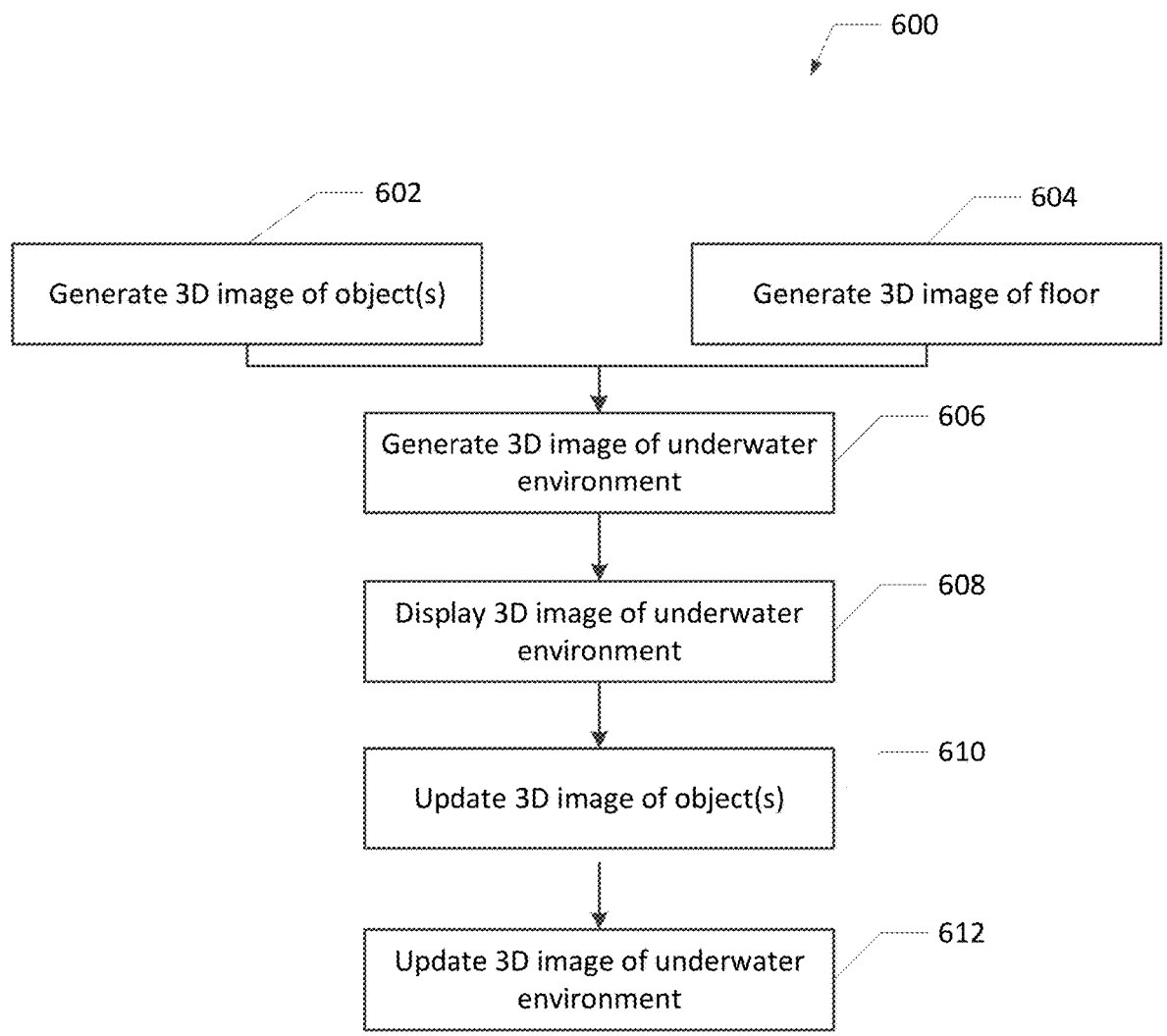
FIG. 6 illustrates a flow chart of exemplary operations for displaying and updating a 3D image of the underwater environment in accordance with an example embodiment of the present invention.

FIG. 6 illustrates a flow chart of exemplary operations for displaying a 3D image of the one or more objects, the bottom surface, and the underwater environment, such as may be performed in block 310 of FIG. 3.

Figure 7A:
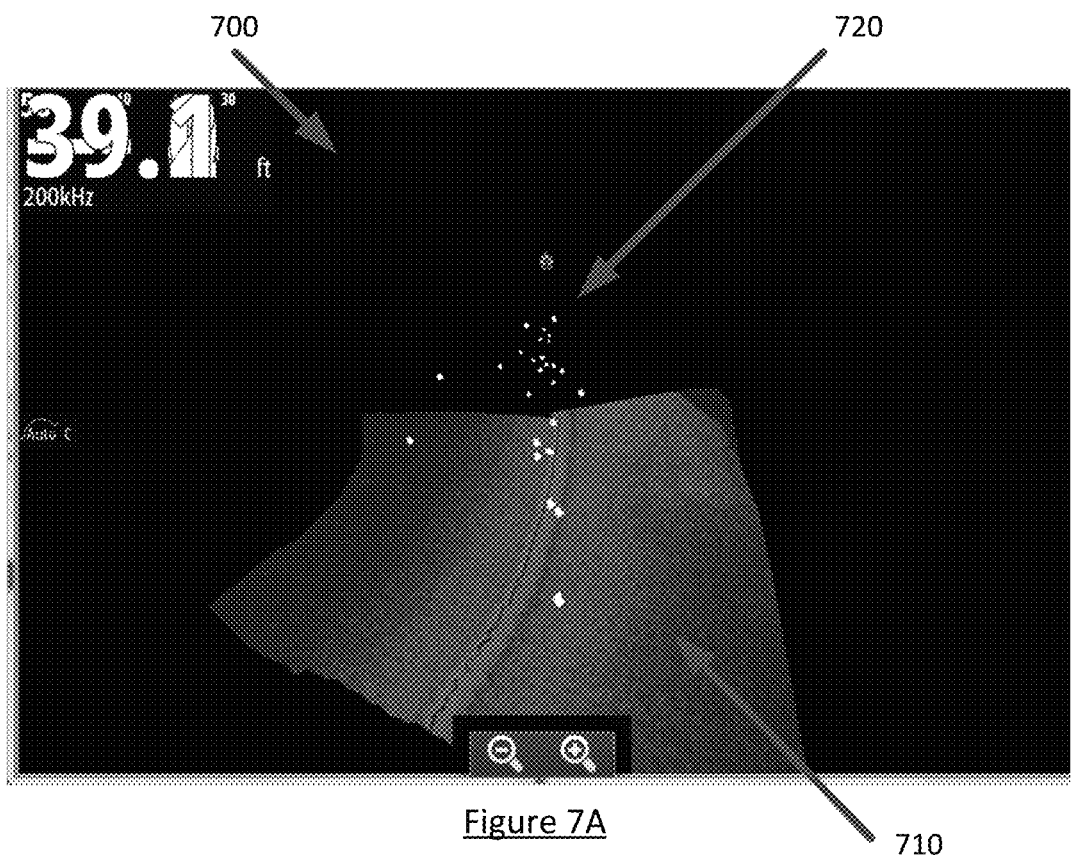
FIGS. 7A-7B illustrate example 3D images in accordance with an example embodiment of the present invention.
Figure 7B:
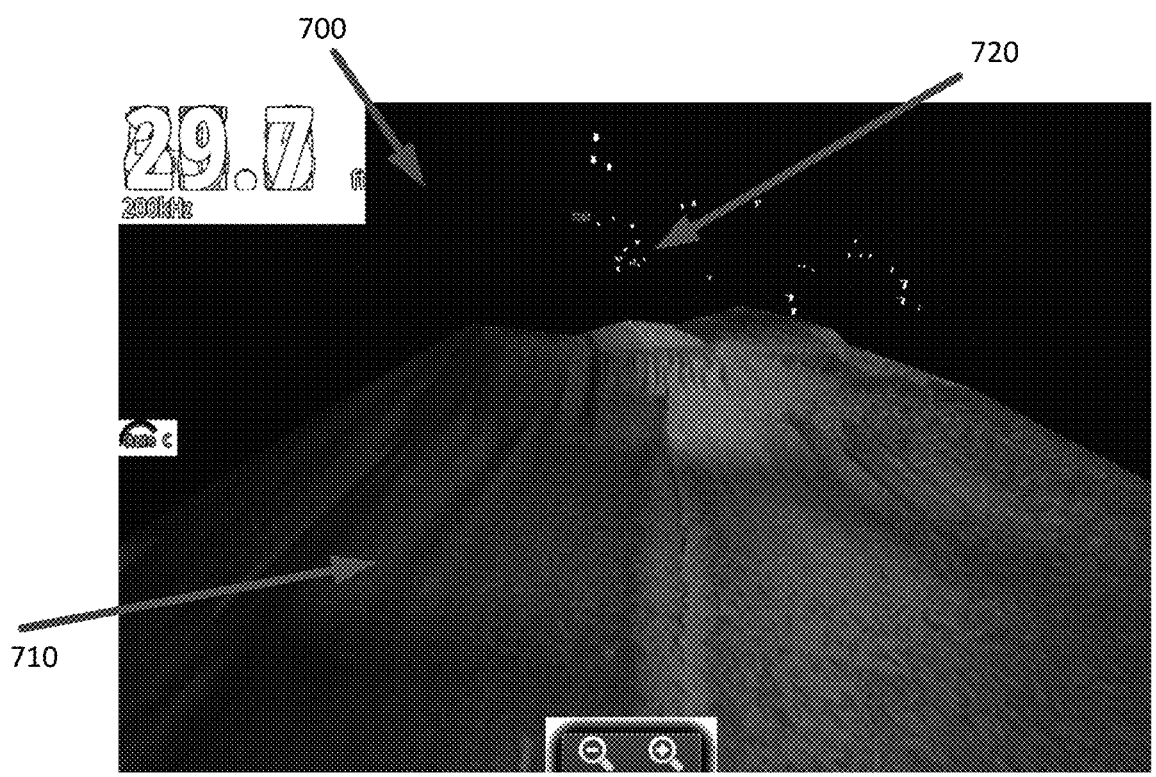

At block 602, one or more 3D images of the one or more objects may be generated. Embodiments of the present invention contemplate various display techniques for representing the object in 3D. For example, a first display method may be performed by providing the raw sonar return date to a display. Here, the individual sonar returns could be displayed, thereby providing single sonar return points on the 3D image. See for example, with reference to FIG. 7A, the sonar returns 720 in the 3D image of the underwater environment 700. Such points may correspond to a fish (or other objects) in the water column. The sonar returns may be returned in real-time or near real-time and may not require any processing. Another example is shown in FIG. 7B.

Figure 8A:
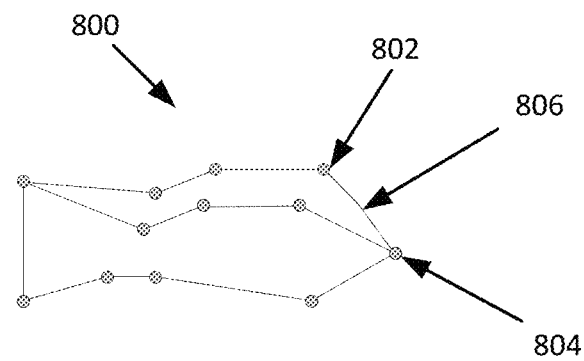
FIG. 8A illustrates an example 3D image of an object formed by connecting sonar returns into a mesh in accordance with some example embodiments of the present invention.
Figure 8B:
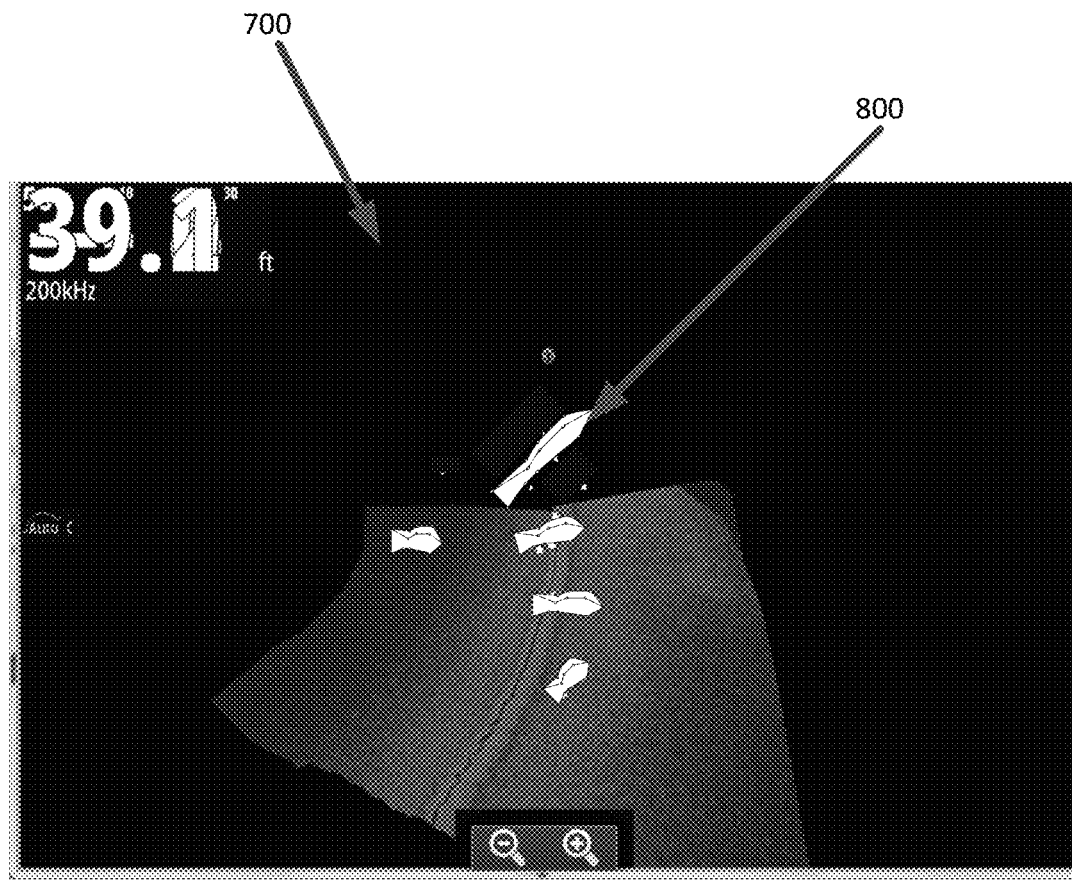
FIG. 8B illustrates another example 3D image of the underwater environment that includes example 3D images shown in FIG. 8A in accordance with some example embodiments of the present invention.

In some embodiments, a second display method may be performed by providing a mesh characterizing the size and shape of the object. In some embodiments, representation of the object may be performed by utilizing each of sonar returns in the cluster representing the object and generating, for example, a mesh such that the object appears solid and representative of the size and shape of the object. Additionally, image formation techniques can be used to guess or estimate at least a portion of the shape of the object, such as may be useful for accounting for the shadow of the sonar returns due to the direction of the emitting surface of the transducer element. An example is illustrated in basic form in FIG. 8A. In this regard, the mesh image 800 is formed by connecting individual sonar returns, such as return 802 and return 804 with line 806. In some embodiments, some or all of the sonar returns from the group/cluster may be used to form the mesh image. With reference to FIG. 8B, the resulting mesh image 800 may be displayed in the resulting 3D image of the underwater environment 700.

In some embodiments, a third display method may be performed by providing a predefined icon for each particular object identified. For example, where a fish is identified, a predefined fish icon may appear on the display. In some embodiments, where classification methods can determine and/or identify the size and/or shape of the particular object, the predefined icon may be shown in a relative size. For example, a particular object may be determined as being small, medium, or large sized, and as such, embodiments of the present invention may provide for displaying predefined icons in a size indicative of the determined size. For example, with reference to FIG. 9, predefined fish icons 740 and 741 are displayed in the underwater environment 700. As shown, the relative size of each fish icon may correspond to the size characteristic of the associated group or cluster of sonar returns.

At block 604, a 3D reconstruction of the bottom surface may then be generated and/or displayed in conjunction with one of the three display method described above. Additional information regarding reconstruction of the bottom surface can be found in U.S. Patent Application No. 62/128,641, filed Mar. 5, 2015 and entitled "Methods and Apparatuses for Reconstructing a 3D Sonar Image," which is commonly owned and incorporated herein by reference in its entirety. In some embodiments, the reconstruction of both the bottom surface and the determined objects are scaled to real-world coordinates.

At block 606, a 3D image of the underwater environment may be generated. Such an image may be comprised of the 3D image of the bottom surface along with one or more 3D images of various objects (or the corresponding sonar returns). Such a 3D image of the underwater environment may then be displayed to a user, such as the 3D image 700 shown in FIG. 7A, 7B, 8B, or 9.

In some embodiments, at block 610, one or more of the 3D images of the various objects may be updated so that the 3D image of the underwater environment is updated and shown in real time, such as at block 612. In some embodiments, this may include updating of the 3D image of the bottom surface as well as the 3D image of the objects. Additionally or alternatively, one or more of the 3D images of the objects may be updated without updating the 3D image of the bottom surface. In some embodiments, as is described in greater detail herein, this may include obtaining additional sonar return data as the watercraft travels and processing the sonar return data to correlate clusters to prior identified clusters, thereby enabling updating of the associated object.

In some embodiments, independent of which display method is provided, the displaying the 3D image of the object and/or group/clusters may comprise, in an instance in which the object is moving, displaying a trail, such as a t the tail end of the object or sonar returns. In some embodiments, the trail may be indicative of movement, the length of the trail being indicative of speed and the angle of the trail being indicative of a direction of movement. An example trail 750 for movement of object 741 is displayed within the 3D image of the underwater environment 700 shown in FIG. 9.

Example Apparatus

Figure 10:
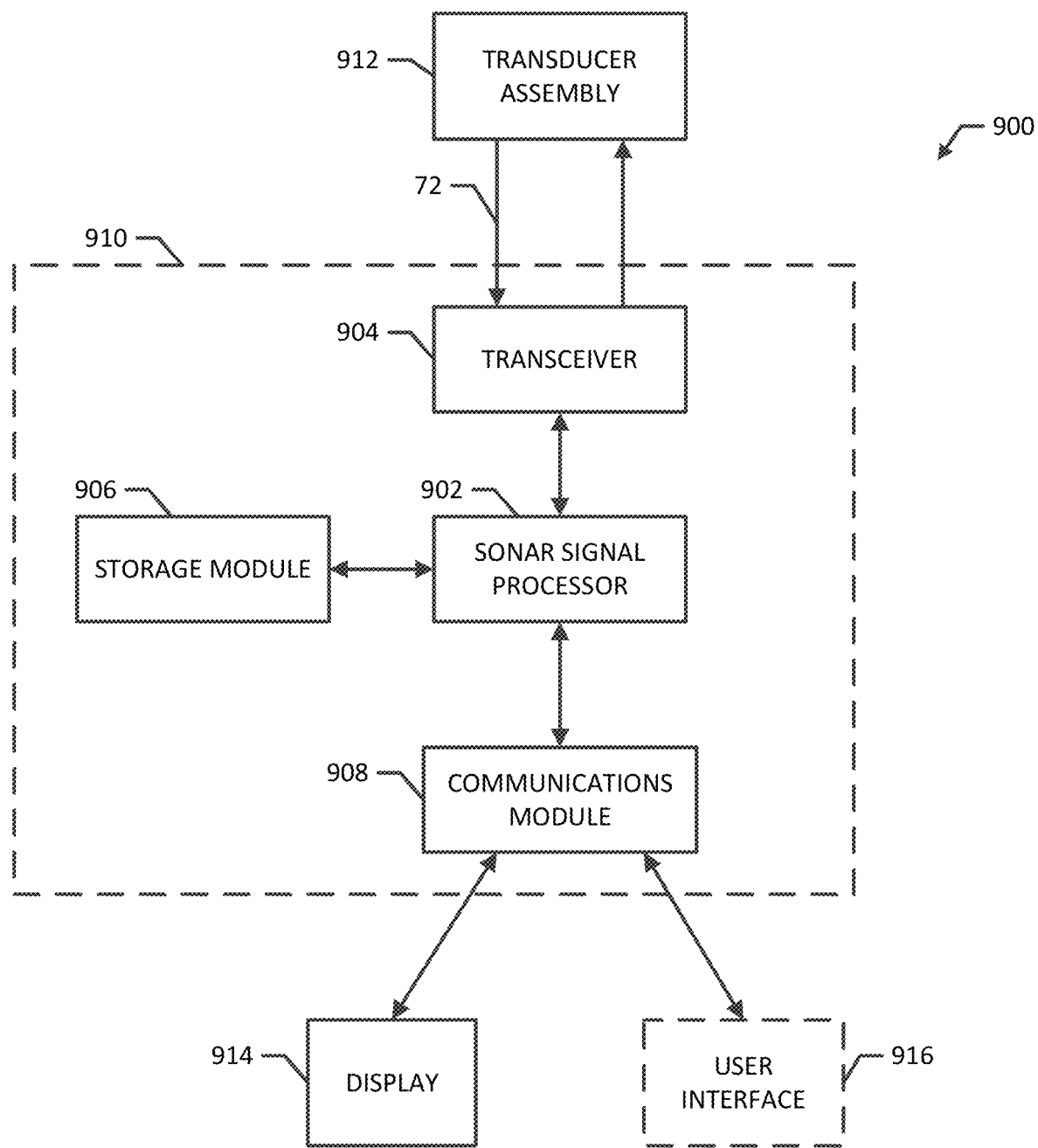
FIG. 10 illustrates a block diagram of an apparatus that may be configured in accordance with example embodiments of the present invention.

The system of an embodiment of the present invention may include an apparatus 900 as generally described below in conjunction with FIG. 10 for performing one or more of the operations set forth by FIGS. 3-6 described herein. It should also be noted that while FIG. 10 illustrates one example of a configuration of an apparatus 900 for imaging an underwater environment, numerous other configurations may also be used to implement other embodiments of the present invention. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

FIG. 10 illustrates a basic block diagram of a sonar system 900 that may be specifically configured in accordance with example embodiments of the present invention. As shown, the sonar system 900 may include a number of different modules or components, each of which may comprise any device or means embodied in either hardware, software, or a combination of hardware and software configured to perform one or more corresponding functions. For example, the sonar system 900 may include a sonar signal processor 902, a transceiver 904, and a transducer assembly 912. The sonar system 900 may further include a storage module 906 for storing sonar return data and other data associated with the sonar system in a non-transitory computer readable medium. The sonar system 900 may also include one or more communications modules 908 configured to communicate with one another in any of a number of different manners including, for example, via a network. In this regard, the communications module 908 may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays 914 may be included in the sonar system 900.

Figure 9:
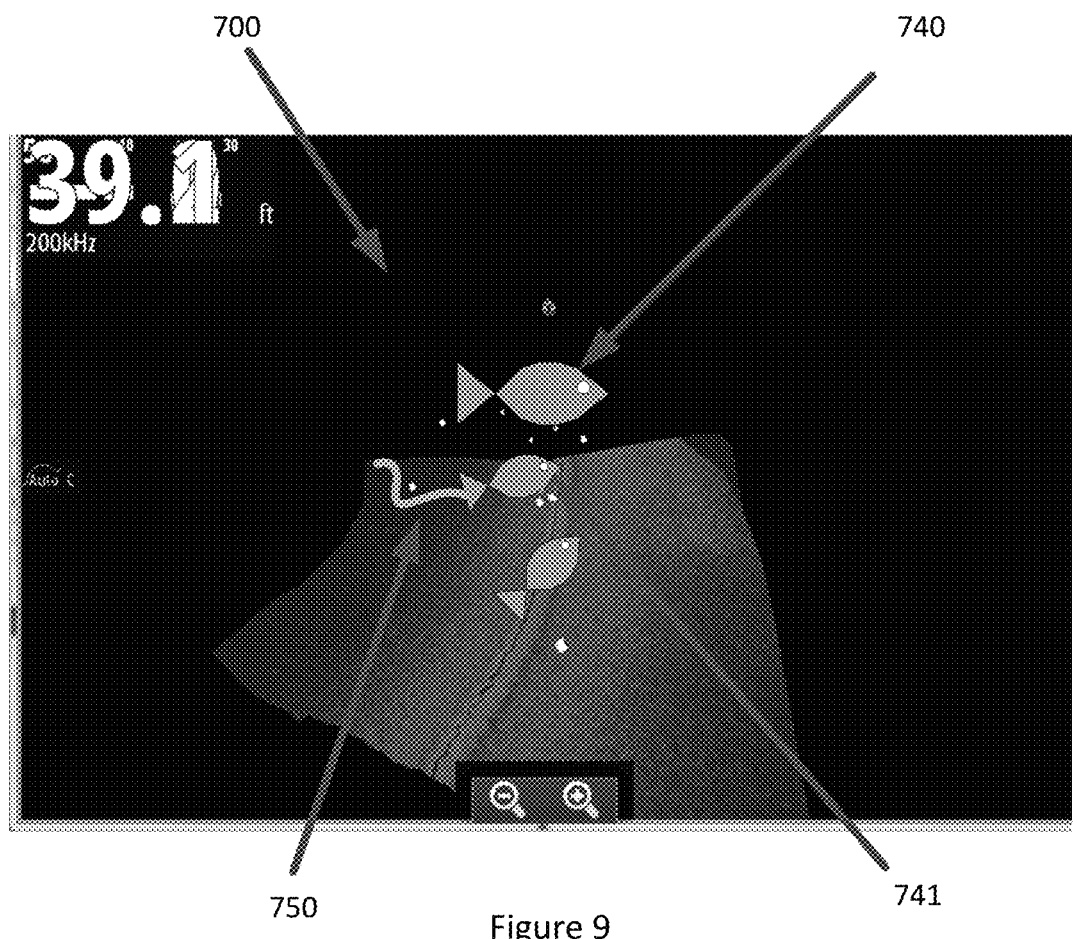
FIG. 9 illustrates another example 3D image of the underwater environment that includes fish icons in accordance with some example embodiments of the present invention.

The display 914 may be configured to display images and may include or otherwise be in communication with a user interface 916 configured to receive an input from a user. The display 914 may be, for example, a conventional LCD (liquid crystal display), a touch screen display, mobile device, or any other suitable display known in the art upon which images may be rendered. Although the display 914 of FIG. 9 is shown as being connected to the sonar signal processor 902 via the communications module 908 (e.g., via a network and/or via an Ethernet hub), the display 914 could alternatively be in direct communication with the sonar signal processor 902 in some embodiments, or the display 914, sonar signal processor 902 and user interface 916 could be in a single housing. The user interface 916 may include, for example, a keyboard, keypad, function keys, mouse, scrolling device, input/output ports, touch screen, or any other mechanism by which a user may interface with the system. Moreover, in some cases, the user interface 916 may be a portion of one or more of the displays 914.

In an example embodiment, the sonar signal processor 902, the transceiver 904, the storage module 906 and/or the communications module 908 may form a sonar module 910. As such, for example, in some cases, the transducer assembly 912 may simply be placed into communication with the sonar module 910, which may itself be a mobile device that may be placed (but not necessarily mounted in a fixed arrangement) in the vessel to permit easy installation of one or more displays 914, each of which may be remotely located from each other and operable independent of each other. In this regard, for example, the communications module 908 may include one or more corresponding interface ports for placing the network in communication with each display 914 in a plug-n-play manner. As such, for example, the communications module 908 may not only include the hardware needed to enable the displays 914 to be plugged into communication with the network via the communications module, but the communications module 908 may also include or otherwise be in communication with software modules for providing information to enable the sonar module 910 to communicate with one or more different instances of the display 914 that may or may not be the same model or type of display and that may display the same or different information. In other words, the sonar module 914 may store configuration settings defining a predefined set of display types with which the sonar module is compatible so that if any of the predefined set of display types are placed into communication with the sonar module 910, the sonar module 910 may operate in a plug-n-play manner with the corresponding display types. Accordingly, the sonar module 910 may include the storage device 906 storing device drivers accessible to the communications module 908 to enable the sonar module 910 to properly work with displays for which the sonar module 910 is compatible. The sonar module 910 may also be enabled to be upgraded with additional device drivers or transceivers to enable expansion of the numbers and types of devices with which the sonar module 910 may be compatible. In some cases, the user may select a display type to check whether a display type is supported and, if the display type is not supported, contact a network entity to request software and/or drivers for enabling support of the corresponding display type.

The sonar signal processor 902 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 902 as described herein. In this regard, the sonar signal processor 902 may be configured to analyze electrical signals communicated thereto by the transceiver 904 to provide sonar data indicative of the size, location, shape, etc. of objects detected by the sonar system 900. For example, the sonar signal processor 902 may be configured to receive sonar return data and process the sonar return data to generate sonar image data for display to a user (e.g., on display 914). Moreover, in some embodiments, the sonar signal processor 902 may be configured to receive downscan sonar return data and/or sidescan sonar return data for processing and generation of sonar image data for display to a user.

In some cases, the sonar signal processor 902 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 902 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with the storage module 906, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 902 may execute commercially available software for controlling the transceiver 904 and/or transducer assembly 912 and for processing data received therefrom.

The transceiver 904 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 904 as described herein. In this regard, for example, the transceiver 904 may include (or be in communication with) circuitry for providing one or more transmission electrical signals to the transducer assembly 912 for conversion to sound pressure signals based on the provided electrical signals to be transmitted as a sonar pulse. The 904 may also include (or be in communication with) circuitry for receiving one or more electrical signals produced by the transducer assembly 912 responsive to sound pressure signals received at the transducer assembly 912 based on echo or other return signals received in response to the transmission of a sonar pulse. The transceiver 904 may be in communication with the sonar signal processor 902 to both receive instructions regarding the transmission of sonar signals and to provide information on sonar returns to the sonar signal processor 902 for analysis and ultimately for driving one or more of the displays 914 based on the sonar returns. In some embodiments, the transmitter circuitry and/or receiver circuitry may be positioned within the transceiver 904 or sonar module 910. In other embodiments the transmitter circuitry and/or receiver circuitry may be positioned within the transducer assembly 912. Likewise, in some embodiments, the transmitter circuitry and/or receiver circuitry may be positioned separate from the transducer assembly 912 and transceiver 904/sonar module 910.

The transducer assembly 912 according to an exemplary embodiment may be provided in one or more housings that provide for flexible mounting with respect to a hull of the vessel on which the sonar system 900 is employed. In this regard, for example, the housing may be mounted onto the hull of the vessel or onto a device or component that may be attached to the hull (e.g., a trolling motor or other steerable device, or another component that is mountable relative to the hull of the vessel), including a bracket that is adjustable on multiple axes, permitting omnidirectional movement of the housing.

The transducer assembly 912 may include one or more transducer elements and/or transducer arrays positioned within the housing, as described in greater detail herein. In some embodiments, each of the transducer elements may be positioned within the housing so as to point toward a predetermined area under or to the side of the vessel.

The transducer elements can convert electrical energy into sound energy (i.e., transmit) and also convert sound energy (e.g., via detected pressure changes) into an electrical signal (i.e., receive), although some transducers may act only as a hydrophone for converting sound energy into an electrical signal without operating as a transmitter, or only operating to convert an electrical signal into sound energy without operating as a receiver. Depending on the desired operation of the transducer assembly, each of the transducer elements may be configured to transmit sonar pulses and/or receive sonar returns as desired. In some embodiments, the transducer assembly 912 may comprise a combination of transducer elements and/or arrays that are configured to transmit sonar pulses and receive sonar returns, transducer elements that are configured to transmit sonar pulses only, and/or transducer elements that are configured to receive sonar returns only.

As described above, FIGS. 3-6 illustrate flowcharts of an apparatus, method, and computer program product according to example embodiments of the invention. It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory of an apparatus employing an embodiment of the present invention and executed by a processor of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included, such as shown by the blocks with dashed outlines. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

That which is claimed:

1. A method for imaging an underwater environment, the method comprising:
    generating, by a sonar signal processor, a 3D matrix based on sonar return data received from the underwater environment, wherein the 3D matrix comprises a plurality of sonar returns each defined by 3D positional values;
    determining, based on at least the 3D positional values of each of the plurality of sonar returns, one or more groups of sonar returns among the plurality of sonar returns in the 3D matrix associated with one or more objects in the underwater environment, wherein the one or more objects are different than a bottom surface of the underwater environment, wherein determining the one or more groups of sonar returns associated with the one or more objects in the underwater environment comprises:
    generating, based on the 3D positional values of each of the plurality of sonar returns, a 3D representation of all of the plurality of sonar returns in the 3D matrix such that each of the plurality of sonar returns defines an x coordinate, a y coordinate, and a z coordinate;
    determining one or more clusters among the plurality of sonar returns in the 3D representation, wherein the one or more clusters among the plurality of sonar returns in the 3D representation each comprise sonar returns that are within a threshold distance of each other within the 3D representation; and
    determining at least one of a shape, a size, and a direction of movement of an object associated with each cluster; and
    generating a 3D image of the one or more groups of sonar returns associated with the one or more objects in the underwater environment.

2. The method of claim 1 further comprising displaying the 3D image of the one or more groups of sonar returns associated with the one or more objects in the underwater environment.

3. The method of claim 1, wherein determining the one or more groups of sonar returns associated with the one or more objects in the underwater environment further comprises:
    determining which corresponds to the bottom surface of the underwater environment by determining the cluster with the largest number of sonar returns; and
    removing the cluster that corresponds to the bottom surface of the underwater environment from the 3D representation.

4. The method of claim 3, wherein determining the one or more groups of sonar returns associated with the one or more objects in the underwater environment further comprises:
    removing any sonar returns from the 3D representation that include a z coordinate below a corresponding z coordinate of the cluster that corresponds to the bottom surface of the underwater environment.

5. The method of claim 3, further comprising:
    generating a 3D image of the cluster that corresponds to the bottom surface of the underwater environment; and
    generating a 3D image of the underwater environment based on the 3D image of the cluster that corresponds to the bottom surface of the underwater environment and the 3D image of the one or more groups of sonar returns associated with the one or more objects.

6. The method of claim 5, further comprising:
generating a second 3D matrix based on second sonar return data received from the underwater environment;
determining one or more second groups of sonar returns among a plurality of sonar returns in the second 3D matrix associated with one or more objects in the underwater environment; and
updating the 3D image of the underwater environment by updating the 3D image of one or more groups of sonar returns associated with the one or more objects in the underwater environment without updating the 3D image of the cluster that corresponds to the bottom surface.

7. The method of claim 1, wherein determining the one or more groups of sonar returns associated with the one or more objects in the underwater environment further comprises:
generating a first 2D representation of each sonar return in at least one cluster, wherein the first 2D representation includes the x coordinate and the y coordinate of each sonar return in the at least one cluster;
generating a second 2D representation of each sonar return in at least one cluster, wherein the second 2D representation includes the x coordinate and the z coordinate of each sonar return in the at least one cluster;
generating a third 2D representation of each sonar return in at least one cluster, wherein the third 2D representation includes the y coordinate and the z coordinate of each sonar return in the at least one cluster; and
analyzing the first 2D representation, the second 2D representation, and the third 2D representation to determine one or more characteristics of the at least one cluster, wherein the one or more characteristics of the at least one cluster include at least one of a shape, a size, and a direction of movement of an object associated with each cluster.

8. The method of claim 1, further comprising:
analyzing the one or more groups of sonar returns associated with the one or more objects to determine movement of the one or more objects; and
generating the 3D image of the one or more sonar returns associated with the one or more objects by generating a trail that corresponds to the movement of the one or more objects.

9. The method of claim 1, wherein generating the 3D image of the one or more groups of sonar returns associated with the one or more objects comprises generating one or more mesh images characterizing the respective one or more objects based on the sonar returns associated with the corresponding object.

10. The method of claim 1, wherein generating the 3D image of the one or more groups of sonar returns associated with the one or more objects comprises positioning one or more predefined icons for the respective one or more objects, wherein each predefined icon is positioned within the underwater environment at a location corresponding to the sonar returns associated with the respective object.

11. The method of claim 1, wherein generating the 3D image of the one or more groups of sonar returns associated with the one or more objects comprises generating raw sonar return data associated with the sonar returns associated with the one or more objects.

12. The method of claim 1, wherein the 3D positional values of each sonar return comprise a distance value, an angle, and a position of capture of the sonar return.

13. An apparatus comprising a sonar signal processor and a memory including computer program code, the memory and the computer program code configured to, with the sonar signal processor, cause the apparatus to:
generate a 3D matrix based on sonar return data received from an underwater environment, wherein the 3D matrix comprises a plurality of sonar returns defined by 3D positional values;
determine, based on the 3D positional values of each of the sonar returns, one or more groups of sonar returns among the plurality of sonar returns in the 3D matrix associated with one or more objects in the underwater environment, wherein the one or more objects are different than a bottom surface of the underwater environment, wherein the determination of the one or more groups of sonar returns associated with the one or more objects in the underwater environment comprises:
generating, based on the 3D positional values of each of the plurality of sonar returns, a 3D representation of all of the plurality of sonar returns in the 3D matrix such that each of the plurality of sonar returns defines an x coordinate, a y coordinate, and a z coordinate;
determining one or more clusters among the plurality of sonar returns in the 3D representation, wherein the one or more clusters among the plurality of sonar returns in the 3D representation each comprise sonar returns that are within a threshold distance of each other within the 3D representation; and
determining at least one of a shape, a size, and a direction of movement of an object associated with each cluster; and
generate a 3D image of the one or more groups of sonar returns associated with the one or more objects in the underwater environment.

14. The apparatus of claim 13, wherein the memory and the computer program code are further configured to, with the sonar signal processor, cause the apparatus to determine the one or more groups of sonar returns associated with the one or more objects in the underwater environment by:
determining which corresponds to the bottom surface of the underwater environment by determining the cluster with the largest number of sonar returns; and
removing the cluster that corresponds to the bottom surface of the underwater environment from the 3D representation.

15. The apparatus of claim 14, wherein the memory and the computer program code are further configured to, with the sonar signal processor, cause the apparatus to determine the one or more groups of sonar returns associated with the one or more objects in the underwater environment by:
removing any sonar returns from the 3D representation that include a z coordinate below a corresponding z coordinate of the cluster that corresponds to the bottom surface of the underwater environment.

16. The apparatus of claim 14, wherein the memory and the computer program code are further configured to, with the sonar signal processor, cause the apparatus to:
generate a 3D image of the cluster that corresponds to the bottom surface of the underwater environment; and
generate a 3D image of the underwater environment based on the 3D image of the cluster that corresponds to the bottom surface of the underwater environment and the 3D image of the one or more groups of sonar returns associated with the one or more objects.

17. The apparatus of claim 13, wherein the memory and the computer program code are further configured to, with the sonar signal processor, cause the apparatus to:

generate a second 3D matrix based on second sonar return data received from the underwater environment;

determine one or more second groups of sonar returns among a plurality of sonar returns in the second 3D matrix associated with one or more objects in the underwater environment; and update the 3D image of the underwater environment by updating the 3D image of one or more groups of sonar returns associated with the one or more objects in the underwater environment without updating the 3D image of the cluster that corresponds to the bottom surface.

18. A computer program product comprising a non-transitory computer readable medium having program code portions stored thereon, the program code portions configured, when said program product is run with a sonar signal processor, to:

generate a 3D matrix based on a sonar return data received from an underwater environment, wherein the 3D matrix comprises a plurality of sonar returns defined by 3D positional values;

determine, based on the 3D positional values of each of the plurality of sonar returns, one or more groups of sonar returns among the plurality of sonar returns in the 3D matrix associated with one or more objects in the underwater environment, wherein the one or more objects are different than a bottom surface of the underwater environment, by:

generating, based on the 3D positional values of each of the plurality of sonar returns, a 3D representation of all of the plurality of sonar returns in the 3D matrix such that each of the plurality of sonar returns defines an x coordinate, a y coordinate, and a z coordinate;

determining one or more clusters among the plurality of sonar returns in the 3D representation, wherein the one or more clusters among the plurality of sonar returns in the 3D representation each comprise sonar returns that are within a threshold distance of each other within the 3D representation;

determining at least one of a shape, a size, and a direction of movement of an object associated with each cluster; and generate a 3D image of the one or more groups of sonar returns associated with the one or more objects in the underwater environment.

19. The computer program product of claim 18, wherein the program code portions are further configured to determine the one or more groups of sonar returns associated with the one or more objects in the underwater environment by:

determining which corresponds to the bottom surface of the underwater environment by determining the cluster with the largest number of sonar returns; and removing the cluster that corresponds to the bottom surface of the underwater environment from the 3D representation.

* * * * *